United States Patent [19]

Yant

[11] Patent Number: 4,634,525
[45] Date of Patent: Jan. 6, 1987

[54] LOOSE PARTS FILTER

[75] Inventor: Howard W. Yant, Unity Township, Westmoreland County, Pa.

[73] Assignee: Westinghouse Electric Corp., Pittsburgh, Pa.

[21] Appl. No.: 657,555

[22] Filed: Oct. 4, 1984

[51] Int. Cl.$^4$ ...................... B01D 25/08; B01D 35/02
[52] U.S. Cl. .................................... 210/171; 210/251; 210/455; 210/488; 210/499; 209/393
[58] Field of Search ............... 210/167, 171, 251, 451, 210/455, 459, 461, 488, 498, 499; 55/505, 525, DIG. 45; 165/119; 209/393, 395; 122/379, 431; 159/42; 134/104

[56] References Cited

U.S. PATENT DOCUMENTS

| | | | |
|---|---|---|---|
| 2,911,097 | 11/1959 | Rose | 209/393 |
| 3,169,111 | 2/1965 | Rose et al. | 210/499 |
| 3,268,990 | 8/1966 | Adler | 210/499 |
| 3,360,911 | 1/1968 | Sweeney | 209/393 |
| 3,370,713 | 2/1968 | Stevens | 210/488 |
| 3,716,144 | 2/1973 | Bartlow | 210/499 |
| 3,738,496 | 6/1973 | Lenz | 210/488 |
| 3,784,015 | 1/1974 | Kasten | 210/488 |
| 3,812,972 | 5/1974 | Rosenblum | 210/498 |
| 3,941,703 | 3/1976 | Binard | 210/499 |
| 3,993,567 | 11/1976 | Ginaven | 209/393 |
| 4,046,359 | 9/1977 | Gellert | 210/488 |
| 4,396,503 | 8/1983 | Schmidt | 209/393 |

Primary Examiner—Richard V. Fisher
Assistant Examiner—Wanda L. Millard
Attorney, Agent, or Firm—L. A. DePaul

[57] ABSTRACT

A filter for removing debris of a predetermined size from a fluid path has a first face disposed transversely in the fluid path and a second face disposed substantially parallel to the first face and displaced therefrom in the direction of fluid flow. The displacement of the second face from the first face substantially defines the strength of the filter with respect to deformation by the fluid flow. The first and second faces cooperate to define a plurality of apertures extending through the filter. The apertures are of a size to preclude passage of the debris while presenting a predetermined resistance to the fluid flow. That predetermined resistance is substantially independent of the filter's strength.

19 Claims, 11 Drawing Figures

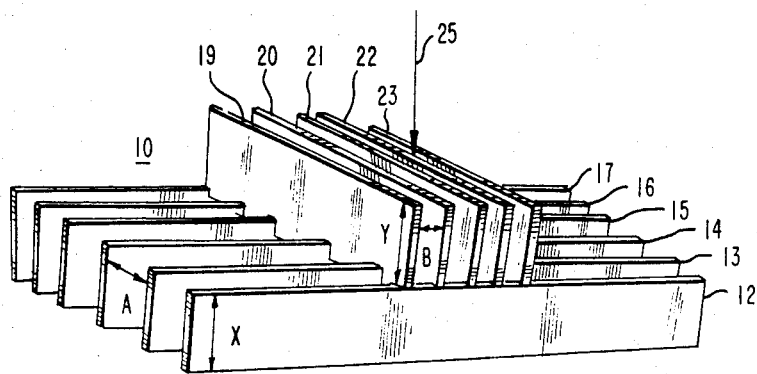
FIG. 1
FIG. 2
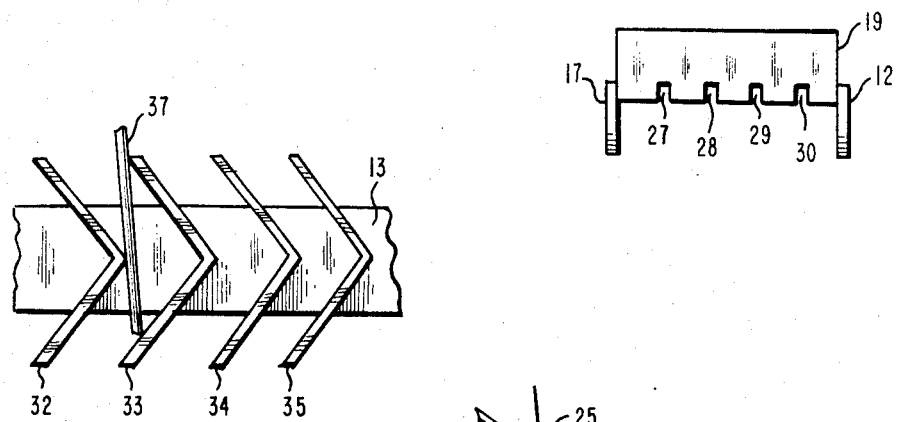
FIG. 3A
FIG. 3
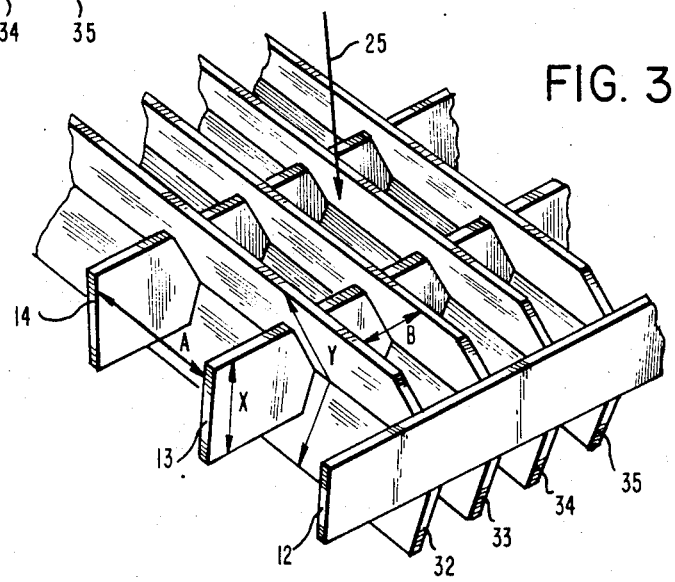

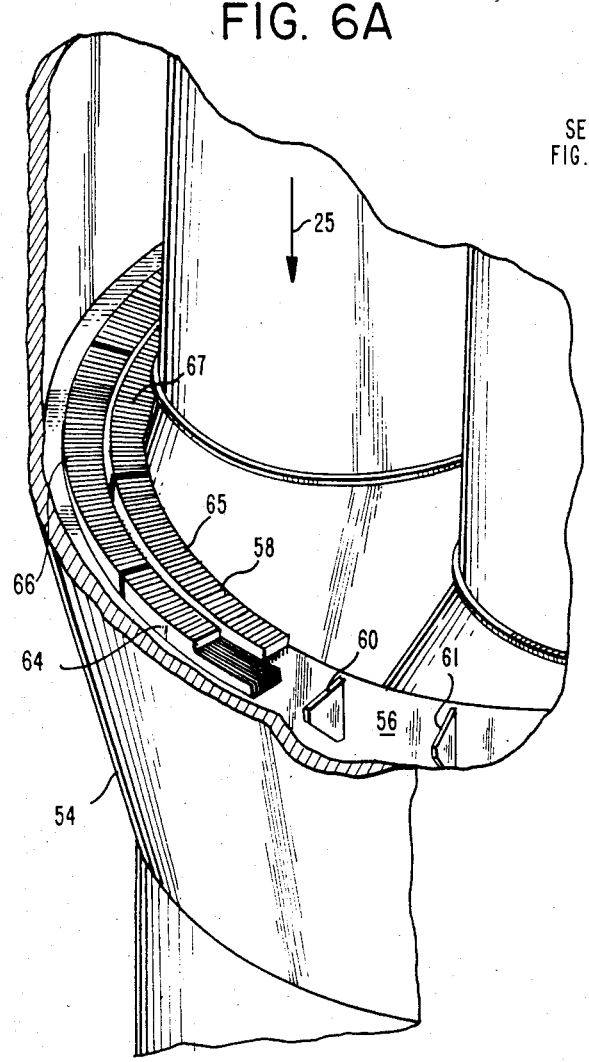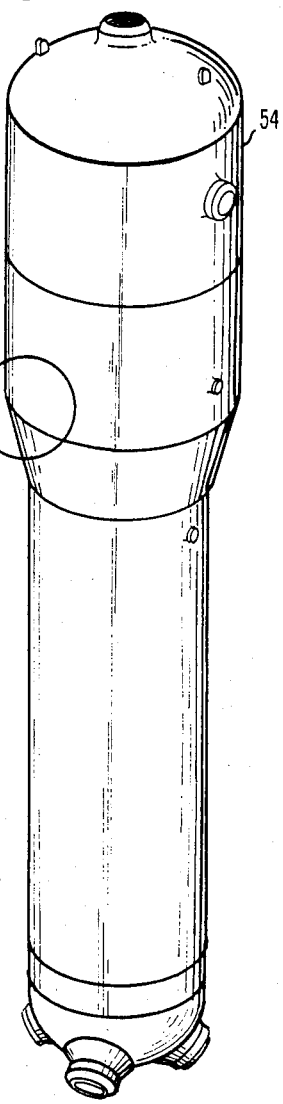

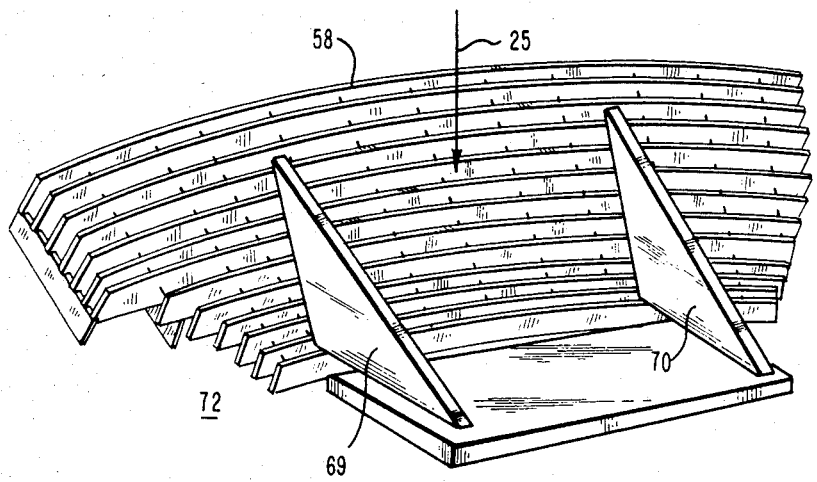
FIG. 8
FIG. 7
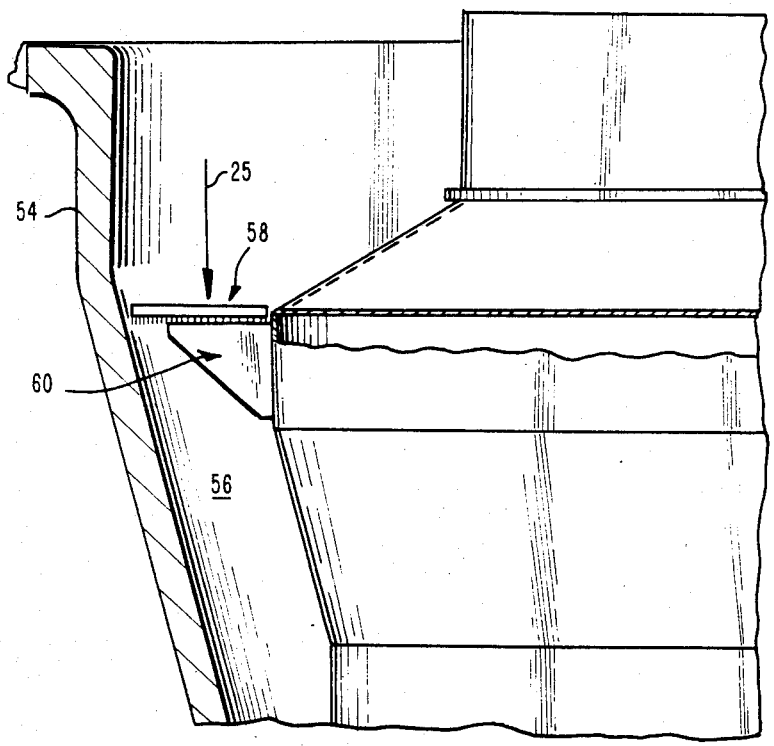

LOOSE PARTS FILTER

BACKGROUND OF THE INVENTION

The present invention is related generally to filters and more specifically to industrial filters for removing debris from a fluid path.

During the construction of large and complex components such as steam generators, heat exchangers, or the like, or any system requiring a large number of pipes, pipe fittings, valves, etc., it is known that various construction materials and tools are often left in the component or system being constructed. Such construction debris may include nuts, bolts, pipe fittings, valve parts, screw drivers, wrenches, or any material or device used in the contruction of the component or system. Operation of the component or system without removing that construction debris may prove extremely detrimental because such debris can puncture or rupture pipes, clog pipes, clog valves, or cause similar problems.

Although industrial filters are well-known and are available in a wide variety of shapes and sizes for performing mechanical as well as chemical types of filtering, the requirements of a filter for removing construction debris are substantially different. A filter for removing construction debris must be sized such that it is capable of removing all debris which may cause damage but must not have an adverse effect on the process being performed. The filter must be further sized such that it will be capable of withstanding deformation by the temperatures, pressures, and fluid velocities to which it will be exposed. Such competing design criteria require new approaches to the design and construction of filters for removing construction debris.

SUMMARY OF THE PRESENT INVENTION

According to one aspect of the present invention, a filter removes debris of a predetermined size from a fluid flowing in a path. The filter has a first face disposed transversely in the fluid path and a second face disposed substantially parallel to the first face but displaced therefrom in the direction of the fluid flow. The first and second faces cooperate to define a plurality of apertures extending through the filter. The apertures are of a size to preclude passage of the debris while presenting a predetermined resistance to the fluid flow. The displacement of the second face from the first face defines the thickness of the filter. The thickness of the filter is sufficient for the filter to resist deformation by the fluid flow without requiring any increase in the predetermined resistance to the fluid flow determined by the size of the apertures.

According to another aspect of the present invention, an annularly-shaped filter removes debris of a predetermined size from a fluid flowing in an annular path. The filter has a first face disposed transversely in the fluid path and a second face disposed substantially parallel to the first face but displaced therefrom in the direction of the fluid flow. The first and second faces cooperate to define a plurality of apertures extending through the filter. The apertures are of a size to preclude passage of the debris while presenting a predetermined resistance to the fluid flow. The displacement of the second face from the first face defines the thickness of the filter. The thickness of the filter is sufficient for the filter to resist deformation by the fluid flow without increasing the predetermined resistance to the fluid flow determined by the size of the apertures.

According to another aspect of the present invention, an annularly shaped filter is comprised of a plurality of abutting arcuate-shaped sections. Each arcuate-shaped section includes an inner portion and an outer portion. The abutment of the adjacent inner portions is staggered with respect to the abutment of the adjacent outer portions thereby providing improved capability in withstanding deformation due to thermal and mechanical loading.

One advantage of the present invention is that once the size of the apertures has been chosen based on considerations such as the size of the debris to be removed from the fluid path and the allowable pressure drop across the filter, a filter can be constructed having any desired strength, i.e., resistance to deformation by the fluid flow, without requiring any further restriction of the fluid flow. Thus, the restriction of the fluid flow is substantially independent of the strength of the filter. Other advantages and benefits of the present invention will become apparent from the description of a preferred embodiment hereinbelow.

BRIEF DESCRIPTION OF THE DRAWINGS

FIG. 1 illustrates a portion of a filter constructed according to the teachings of the present invention;

FIG. 2 illustrates three members of the filter illustrated in FIG. 1;

FIG. 3 illustrates a portion of another embodiment of a filter constructed according to the teachings of the present invention;

FIG. 3a illustrates a side view of the filter shown in FIG. 3 with the end member removed;

FIG. 6 illustrates the location of a filter within a steam generator;

FIG. 6a illustrates one example of an annularly-shaped filter constructed according to the teachings of the present invention located in an annularly-shaped downcomer of the steam generator shown in FIG. 6;

FIG. 7 illustrates a cross-sectional view of the steam generator and annularly-shaped filter shown in FIG. 6A; and FIG. 8 illustrates another orientation of the filter shown in FIG. 7.

DESCRIPTION OF THE PREFERRED EMBODIMENT

Figure 4:
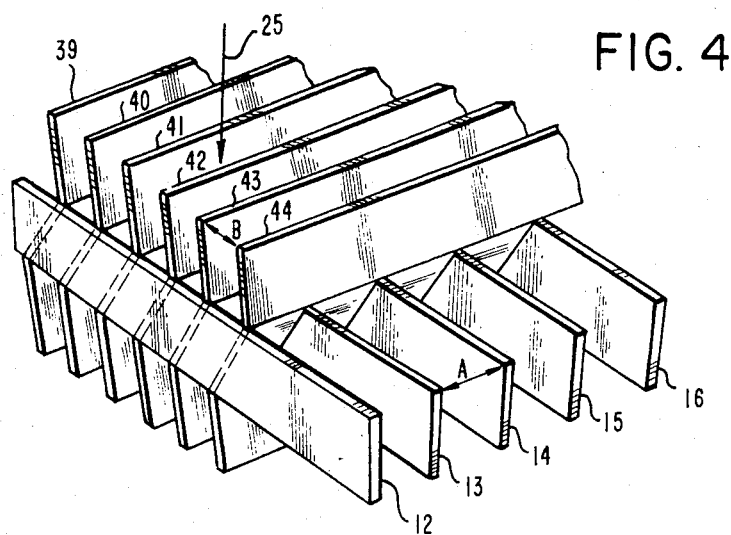
FIGS. 4 and 5 illustrate portions of other embodiments of filters constructed according to the teachings of the present invention.

FIG. 1 illustrates a portion of a filter 10 constructed according to the teachings of the present invention. The filter portion 10 is constructed of a first group of substantially parallel members 12, 13, 14, 15, 16, and 17 and a second group of substantially parallel members 19, 20, 21, 22, and 23 disposed proximate to the first group of members 12 through 17. The second group of members 19 through 23 is oriented at an angle with respect to the first group of members 12 through 17. The angle of orientation shown in FIG. 1 is ninety degrees such that the members 12 through 17 of the first group cooperate with the members 19 through 23 of the second group to establish a rectangular pattern. The filter portion 10 shown in FIG. 1 is incomplete in that additional members would be added to the second group of substantially parallel members 19 through 23 in order to complete the rectangular pattern along the length of each of the members 12 through 17 of the first group of members. Clearly, a filter of any dimension can be provided by adding additional members to the first and second groups of members.

The filter portion 10 illustrated in FIG. 1 may be constructed of commercially available prefabricated deck grating having a typical thickness of, for example, one-tenth of an inch and a typical height X, Y of, for example, two inches. The spacing A between each of the members 12 through 17 of the first group of members and the spacing B between each of the members 19 through 23 of the second group of members determines the size of the apertures of the filter 10 and thus the size of the debris which the filter 10 will preclude.

In one embodiment, the spacing A between each of the members 12 through 17 of the first group of members is approximately nine-tenths of an inch and the spacing B between each of the members 19 through 23 of the second group of members is approximately three-tenths of an inch. With such a filter disposed transversely in a fluid path, tools such as screwdrivers, wrenches, etc., and construction materials such a nuts, bolts, piping, pipe fittings, valve pieces, or anything left during construction having a size greater than nine-tenths of an inch by three-tenths of an inch will be precluded from continuing further through the fluid path by the filter portion 10. Such a filter 10 nevertheless has an open area of approximately sixty-five percent such that the restriction of the fluid flow is kept to a minimum.

An important feature of the present invention is the design of the filter 10 shown in FIG. 1 which has a high percentage of open area yet permits a filter having any desired resistance to deformation by the fluid flow to be constructed without further restriction of the fluid flow. That is accomplished by increasing the height X of each of the members 12 through 17 of the first group of members and increasing the height Y of each of the members 19 through 23 of the second group of members. By increasing the dimensions X and Y, the strength of the filter portion 10 is increased with respect to the direction of fluid flow indicated by arrow 25. This increase in strength increases the resistance to deformation by the fluid flow. This increase in strength, or resistance to deformation by the fluid flow, is achieved without decreasing the size of the apertures or the number of the apertures. Thus, once the size of the apertures has been determined based on the size of the debris to be precluded and the allowable pressure drop across the filter, a filter can be constructed having any desired strength without any further restriction of the fluid flow.

The orientation of the members 12 through 17 of the first group of members with respect to the members 19 through 23 of the second group of members is maintained by appropriate interconnection of the members. In FIG. 2 wherein like components have the same reference numerals, the first member 19 of the second group of members is illustrated. The first member 19 of the second group of members has the first member 12 and the last member 17 of the first group of members welded thereto at opposite ends. The first member 19 of the second group of members is provided with four rectangular notches 27, 28, 29, and 30 sized to receive the remainder of the members 13 through 16 of the first group of members. Each of the notches 27 through 30 is deep enough to permit welding of the members 13 through 16 in their respective notch. In the embodiment described above, each of the notches 27 through 30 would be approximately one-tenth of an inch wide and one-quarter inch deep. By welding each of the other members 20 through 23 of the second group of members to the first member 12 and last member 17 of the first group of members, and by providing each of the members 20 through 23 of the second group of members with notches for receiving the remaining members 13 through 16 of the first group of members, an extremely rigid and strong filter 10 is provided.

There are numerous embodiments of the present invention wherein a filter has a design such that any desired resistance to deformation by the fluid flow can be achieved without further restriction of the fluid flow. Other contemplated embodiments are illustrated in FIGS. 3, 4, and 5.

In FIG. 3, the members 19 through 23 of the second group of substantially parallel members are replaced by chevron-shaped members 32, 33, 34, and 35. The chevron-shaped members 32 through 35 have the first member 12 of the first group of members welded at one end thereof. The last member 17 of the first group of members is welded to the opposite end (not shown) of each of the chevron-shaped members 32 through 35. Each of the chevron-shaped members 32 through 35 has an opening therethrough for receiving the remaining members 13 through 16 (15 and 16 not shown). Each of the members 13 through 16 may be welded at their intersection with each of the chevron-shaped members 32 through 35. The filter shown in FIG. 3 exhibits the same characteristic as the filter shown in FIG. 1 in that the strength of the filter may be increased without any further restriction of the fluid flow. That can be achieved by increasing the dimension X of the first group of members and the dimension Y of the second group of members.

The filter shown in FIG. 3 has a further advantage over the filter illustrated in FIG. 1. FIG. 3a illustrates a side view of the filter shown in FIG. 3 with the first member 12 of the first group of members removed. As can be seen from FIG. 3a, the chevron-shaped sections 32 through 35 are spaced such that there are no open straight axial paths through the filter. The chevron-shaped sections 32 through 35 thus cooperate with one another to preclude the passage of rod-shaped debris 37. The filter shown in FIG. 3 precludes passage of the same debris as the filter shown in FIG. 1 and additionally precludes passage of debris such as scewdrivers, rulers, pencils, or the like which approach the filter perpendicularly as shown by the rod-shaped debris 37 in FIG. 3a. The preclusion of rod-shaped debris is achieved without requiring any further restriction of the fluid flow.

Figure 5:
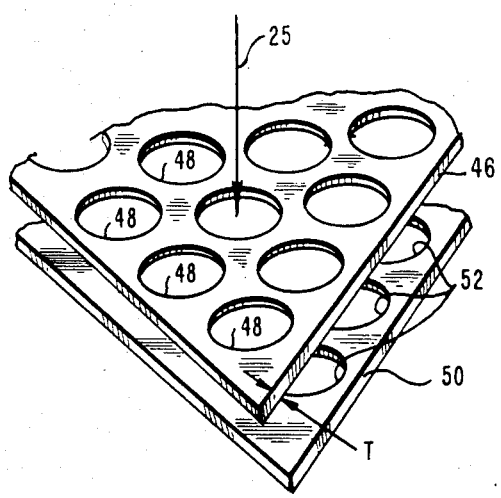

Another embodiment of the present is shown in FIG. 4. In FIG. 4 the chevron-shaped members 32 through 35 are replaced by compound chevron-shaped members 39, 40, 41, 42, 43, and 44. The compound chevron-shaped members 39 through 44 are connected to the members 12 through 16 of the first group of members in the same manner as described above in conjunction with FIG. 3. The filter illustrated in FIG. 4 operates in the same manner as discussed above in conjunction with FIG. 3 with the exception that the compound chevron-shaped members 39 through 44 provide additional filtering action against rod-shaped debris provided that the compound chevron-shaped members 39 through 44 are spaced such that no open straight axial path through the filter exists.

Yet another embodiment of the present invention is illustrated in FIG. 5. In FIG. 5 a first plate 46 is provided with a plurality of apertures 48. The filter formed by the first perforated plate 46 has the same characteristic of the filters previously described, i.e., any desired resistance to deformation by the fluid flow may be achieved by increasing the thickness T of the perforated plate 46 without further restricting the fluid flow.

Figure 5A:
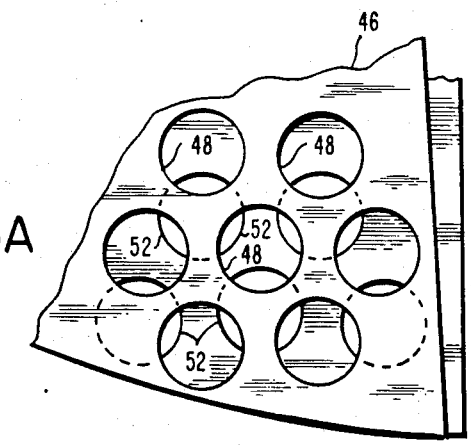
FIG. 5a illustrates a top view looking through the filter shown in FIG. 5.

As shown in FIG. 5, it may be desirable to add a second plate 50 having a plurality of apertures 52 therethrough. The orientation of the apertures 48 of the first plate 46 with respect to the apertures 52 of the second plate 50 determines the amount of additional filtering. One predetermined relationship between the apertures 48 of the first plate 46 and the apertures 52 of the second plate 50 is shown in FIG. 5a.

One anticipated environment wherein a filter constructed according to the teachings of the present invention may be used is a steam generator 54 of the type illustrated in FIG. 6. The steam generator 54 is a heat exchanger wherein a superheated liquid under high pressure enters the bottom of the steam generator 54 and circulates through a plurality of steam generator tubes (not shown). The space between the steam generator tubes is filled with water. As the superheated liquid passes through the steam generator tubes the water between the tubes absorbs heat, vaporizes, and rises to the top of the steam generator 54. After the heat energy in the steam has been extracted, the steam recondenses and flows as liquid water down an anular downcomer 56 located around the outer periphery of the steam generator 54 as shown in FIGS. 6a and 7.

In FIG. 6a the annular filter 58 is of the rectangular-type shown in FIG. 1. However, the filter 58 could be of the chevron-type shown in FIG. 3, the compound chevron-type shown in FIG. 4 or the perforated plate-type shown in FIG. 5. The filter 58 extends completely around the inner periphery of the steam generator 54 but is shown partially broken away in FIG. 6a to illustrate triangular supports 60 and 61. A sufficient number of such triangular supports are provided to support the annular filter 58.

The annular downcomer 56 in one embodiment is approximately twelve inches wide at the location where the filter 58 is positioned. The annularly-shaped filter 58 is comprised of twenty-four six-inch wide arcuate-shaped sections, four of which, 64, 65, 66, and 67 are illustrated in FIG. 6a. The arcuate-shaped sections are constructed and positioned such that the abutment of adjacent outer arcuate-shaped sections 64 and 66 is staggered with respect to the abutment of adjacent inner arcuate-shaped sections 65 and 67. This staggered relationship provides an improved capability in withstanding deformation due to thermal and mechanical loading.

The dimension of the apertures of the filter 58 is chosen by the designer depending upon the spacing between the steam generator tubes. Thus, the annular downcomer 56 forms a primary fluid path and the spacing between the plurality of steam generator tubes forms a plurality of secondary fluid paths. The spacing between steam generator tubes may vary from approximately three-tenths of an inch to four-tenths of an inch. Typical debris that has been found to damage the steam generator tubes or clog the spacing between steam generator tubes includes a portion of a baffle plate, a coil spring eight and one-half inches long and one and one-quarter inches in diameter, and a connection pin two and one-quarter inches long and one inch in diameter. Thus, the apertures of the filter 58 would be sized accordingly to prevent passage of debris capable of damaging the steam generator tubes.

The filter 58 shown in the steam generator 54 is located in a position such that the filter 58 may be periodically cleaned to remove the accumulated debris. It is also desirable to position the filter 58 such that existing steam generators 54 may be retrofit with such a filter. The filter 58 is constructed of any material compatable with the internals of the steam generator 54 such as carbon steel and is capable of withstanding the environment within the steam generator 54, e.g., temperatures in excess of 500° F. (260° C.) and pressures on one thousand pounds per square inch.

It is anticipated that in providing a filter 58 as a retrofit item, the shape and orientation of the filter 58 will have to be adjusted for different types of steam generators Shown in FIG. 8 is the filter 58 oriented at an angle with respect to the direction of fluid flow indicated by the arrow 25. Such an orientation requires additional support brackets 69 and 70 to maintain the orientation of the filter 58. Such an orientation presents a greater surface area, flow area, and less pressure drop. It is also anticipated that portions of the filter 58 may be removed, or cut out, as designated generally by the area 72, to allow the filter 58 to be inserted in the annular downcomer 56 despite pipes or supports which may protrude into that area.

Although the filter of the present invention has been described in conjunction with a steam generator, it is anticipated that such a filter will be useful in blowing out pipes in a chemical plant, on trash racks in sewage plants, in filtering debris from water pumped from a river or any similar environment. Thus, it will be understood that many modifications and variations will be readily apparent to those of ordinary skill in the art. This application and the following claims are intended to cover those modifications and variations.

What is claimed is:

1. Apparatus for removing debris of a predetermined size from a fluid flowing in an annular path, comprising a filter formed from an annular array of abutting arcuate-shaped filter sections, each section having a first face disposed transversely in the fluid path and a second face disposed substantially parallel to said first face and displaced therefrom in the direction of fluid flow, said first and second faces cooperating to define a plurality of apertures extending through said filter section of a size to preclude passage of the debris with a predetermined resistance to the fluid flow, the displacement of said second face from said first face defining a thickness of said filter section being sufficient for said filter section to resist deformation by the fluid flow without increasing said predetermined resistance to the fluid flow, and wherein said array of abutting, arcuate-shaped sections includes an inner portion and an outer portion in which the filter sections forming the outer portion are staggered with respect to the filter sections forming the inner portion in order to minimize the deformation of the annular filter array in response to thermal and mechanical loading.

2. Apparatus according to claim 1, wherein each of said filter section includes a first group of substantially parallel members disposed transversely in the fluid path and a second group of substantially parallel members disposed transversely in the fluid path proximate to said first group and oriented at an angle with respect to said first group.

3. Apparatus according to claim 2, wherein said members of said first and second groups are substantially flat and wherein said flat surfaces of said members are oriented parallel to the direction of fluid flow.

4. Apparatus according to claim 3, wherein the flowing fluid exerts a load on said filter sections, and each of said filter sections has a load bearing strength to resist said load that is increased by increasing the height of said flat surfaces, but wherein the fluid resistance of the filter section remains substantially the same regardless of the height of said surfaces.

5. Apparatus according to claim 2, wherein said angle between said first group of members and said second group of members includes an angle of substantially ninety degrees.

6. Apparatus according to claim 2, wherein each of said members of said first group are connected to certain of said members of said second group by complementary notches in some of said members which receive the edges of other of said members.

7. Apparatus according to claim 6, wherein said connection further includes a weld joint where said notches receive said edges.

8. Apparatus according to claim 2, wherein said members of one of said first and second groups include chevron-shaped members.

9. Apparatus according to claim 8, wherein the spacing between said chevron-shaped members precludes passage of rod-shaped debris.

10. Apparatus according to claim 8, wherein said chevron-shaped members include compound chevron-shaped members.

11. Apparatus according to claim 1, wherein said filter sections include a first member having apertures therethrough.

12. Apparatus according to claim 11, wherein the thickness of said filter sections are increased by increasing the thickness of said member.

13. Apparatus according to claim 11, further comprising a second member having apertures therethrough, and wherein said second member is located proximate to said first member such that a predetermined relationship exists between said apertures of said first and second members.

14. Apparatus according to claim 1, wherein said filter is oriented at an angle with respect to the fluid flow.

15. Apparatus according to claim 1, wherein said filter is constructed of a material compatible with the material of the fluid path.

16. Apparatus according to claim 15, wherein said filter is constructed of carbon steel.

17. Apparatus according to claim 1, wherein the fluid path includes a primary fluid path and a plurality of secondary fluid paths, and wherein the size of said apertures is a function of the dimensions of said secondary fluid paths.

18. Apparatus according to claim 1, wherein the annular path includes the annular downcomer of a steam generator.

19. Apparatus for removing debris of a predetermined size from water flowing through an annular downcomer that defines a fluid path in a steam generator comprisng an annular array of load bearing, arcuate-shaped filter sections that abut one another, wherein each section is formed from first and second groups of elongated, substantially flat and mutually parallel members whose flat sides are oriented parallel to the direction of the flow of water, and wherein each section has:
a first face disposed transversely with respect to the fluid path formed by a plurality of leading edges of the first group of elongated, substantially flat and mutually parallel members,
a second face also disposed transversely with respect to the fluid path and also being formed by a plurality of leading edges of the second group of elongated, substantially flat and mutually parallel members,
wherein the longitudinal axes of the members of the first and second groups are disposed substantially orthogonally with respect to one another to define a plurality of apertures of a size to preclude passage of debris larger than said apertures, and a plurality of trailing edges of the first group of members are interconnected with the leading edges of the second group of members by a plurality of notches in some of the members which receive the edges of others of said members,
the load-bearing strength of each filter section being dependent upon the height of the members of the first and second groups, said height being at least sufficient to resist deformation from the pressure exerted thereon by said water flow, but wherein the fluid resistance of each of said sections remains substantially the same regardless of the height of said members,
wherein said array of abutting, arcuate-shaped sections includes an inner portion and an outer portion in which the filter sections forming the outer portion are staggered with respect to the filter sections forming the inner portion of said array in order to minimize the deformation of the annular filter array in response to thermal and mechanical loading.

* * * * *